United States Patent [19]

Lanham

[11] Patent Number: 5,351,524
[45] Date of Patent: Oct. 4, 1994

[54] GAS LEAK DETECTION TEST STATION

[76] Inventor: David W. Lanham, 941 SW. 108th Ave., Pembroke Pines, Fla. 33026

[21] Appl. No.: 110,552

[22] Filed: Aug. 23, 1993

[51] Int. Cl.$^5$ ............................................. G01M 3/28
[52] U.S. Cl. ..................................... 73/40.50 R
[58] Field of Search ................... 73/40.5 R, 46, 49.8

[56] References Cited

U.S. PATENT DOCUMENTS

| 3,352,147 | 11/1967 | Ligon | 73/40.5 R |
| 3,521,481 | 7/1970 | Tyrone | 73/40.5 R |
| 4,895,018 | 1/1990 | Asbra | 73/40.5 R |
| 4,984,448 | 1/1991 | Jordan et al. | 73/40.5 R |
| 5,152,167 | 10/1992 | Moody | 73/40.5 R X |
| 5,183,078 | 2/1993 | Sorrell | 73/40.5 R X |

FOREIGN PATENT DOCUMENTS 2239529  7/1991  United Kingdom ............ 73/40.5 R

Primary Examiner—Hezron E. Williams
Assistant Examiner—Joseph W. Roskos
Attorney, Agent, or Firm—Malloy & Malloy

[57] ABSTRACT

To be used in a gas supply line having an upstream main on/off valve, a meter downstream of the valve, and a pressure regulator intermediate of the valve and meter, the gas supply line being used to supply gas to appliances at an installation site, a gas leak detection test station including a fitting connected in fluid communication with the line downstream of the pressure regulator, fitting having a body with a main inlet opening, a main outlet opening, and a flow path between the openings. The station further having a fixed valve body portion integrally formed with the body of the fitting, the fixed valve body having a movable valve portion which is movable between a normal valve closed position and a valve open position, the movable valve portion normally being urged towards the normal closed position, the body portion being adapted for connection with a manometer.

7 Claims, 1 Drawing Sheet

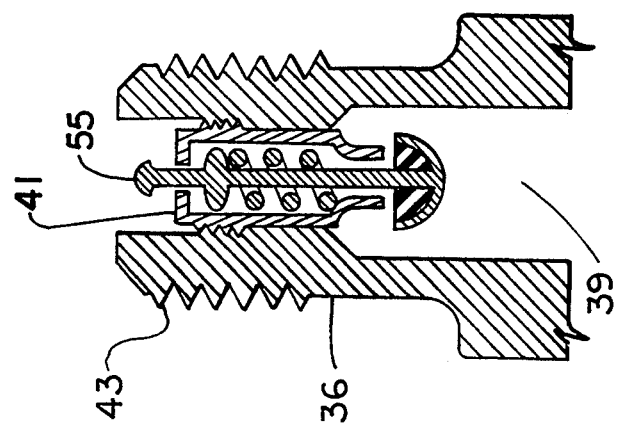
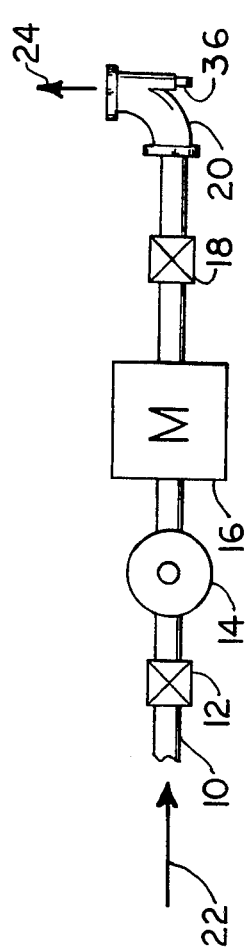
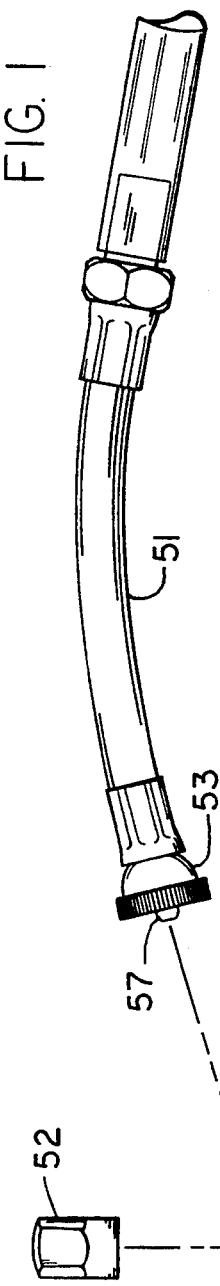
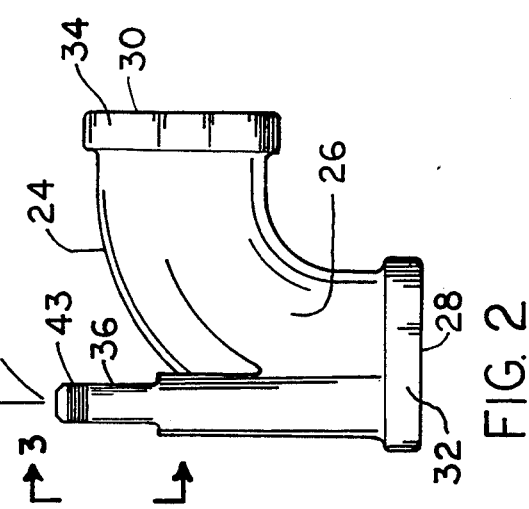

GAS LEAK DETECTION TEST STATION

FIELD OF THE INVENTION

This invention relates to a test station for a gas supply line.

BACKGROUND OF THE INVENTION

Throughout the nation, there are many installation sites which use natural gas, homes, for example. Conventionally, the natural gas is provided through a riser tube or supply line with the flow of gas supplied to the home being controlled by a main on/off valve; and it then passes through a pressure regulator and through a meter. The metered gas then flows into the installation site through a test station on demand, that is, upon the use of an appliance(s) and the like.

There has long been a problem of gas leaks which is troublesome and which is well known and appreciated in the field. One general source of leaks are at joints or connections of the gas line to appliances within the installation site. For this reason, a test station is conventionally installed in the line downstream of the meter to determine if there are any gas leaks at the installation site. The set up of the test station often becomes another annoying source of leaks.

Generally speaking, leaks usually develop at joints which connect tubular gas pipe sections in fluid communication with one another or to an appliance. To conduct a test, a manometer is connected into the gas line at the test station downstream of the pressure regulator and meter. Thereafter, all of the utility gas outlet valves are closed and the main upstream on/off valve is closed. If the pressure as sensed by the manometer decreases in the downstream service line, this, of course, signals that there is a leak which needs to be repaired.

As can be readily appreciated, there are many types and sizes of set ups for these test stations which are dictated in part by the wide variety of construction sites which exist. Often, the space for a suitable test station is very cramped or of an unusual configuration being confined by surrounding building structure. Conventional test stations are composed of interconnected plumbing type fittings, such as T-shaped members, elbows, and tubular links. They are more often than not unsightly, tortured, configurations of pieces of plumbing which are prone to troublesome leaks.

It is important that a test station be small and compact, easily installed, and more efficient than previously used gas line testing stations. Further, the plugs at conventional test stations are attractive to smaller children who are apt to remove one by unscrewing it and with this, there is attendant, unsafe, resulting leaks.

SUMMARY OF THE INVENTION

It is, accordingly, an object of this invention to provide an improved test station for a gas supply line which is easily installed, safe, easily utilized, and compact. Thus, this invention is of a one-piece gas line test station which includes a fitting, such an elbow, with a main inlet and a main outlet and a normally closed valve between the inlet and outlet. The valve includes a first fixed valve means portion integral with the fitting and a separate movable valve means portion, movable from a normally closed position to a temporary open position for gas pressure testing purposes. Means are provided in between the valve means portions normally urging the portions into a valve closed position with the movable valve portion being yieldable to temporarily establish a valve open position for testing. Upon opening the valve, energy is stored in a biasing means or spring means tending to close the valve. Threads are preferably provided on the fitting comprising means to connect the fitting in fluid communication in a gas supply line. Finally, means are also provided to operably connect the valve in fluid communication to a manometer to test for leaks.

The purpose of this invention is to provide a gas leak detection station to be used in conjunction with a water manometer wherein the station is a permanent installation and upon testing, there is not a need to be concerned with gas leakage at the station when checking piping at an installation for leaks. The gas leak testing station is compact and replaces a variety of conventional leak detection and load set devices which are composed of numerous interconnected fittings and complicated procedures. Generally, the test station, once installed, saves time, effort, and money- The test station provides for one-step leak testing from the high pressure on/off valve on the riser through the meter and the complete downstream supply line system. Further, it provides for setting of load pressures and regulator lock-up and allows more versatility in setting meters because the test station is compact saving space. Generally, the fitting included in the test station is of integral or one-piece construction, except for a movable valve portion, which offers safety against leaks and it can be installed at any location downstream of the meter regulator. Ease of use and reliability makes the test station safe and efficient; and it can be used on a wide variety of diameters characteristic of piping systems.

BRIEF DESCRIPTION OF THE DRAWINGS

FIG. 1 is a schematic view illustrating a gas supply line.

FIG. 2 is an exploded view of a test station for a gas supply line with a portion of a manometer illustrating the distal end thereof.

FIG. 3 is a partial view in cross section of the valve means included integrally on the fitting seen in FIG. 2.

DETAILED DESCRIPTION OF THE PREFERRED EMBODIMENT

Referring to the drawings, there is shown in FIG. 1 a gas supply line generally indicated by the numeral 10. It has a main on/off valve 12, a pressure regulator 14, a meter 16, a check valve 18, if desired, and a gas leak detection test station 20 to be described more fully hereinafter. Gas is supplied to an installation site in the direction of the arrowed line 22 leading to a line 24 to an installation site. Referring now to the test station 20, it is seen in FIG. 2 to include a fitting 24 to be connected in fluid communication in the line downstream of the pressure regulator. The fitting includes a body 26 having a main inlet opening 28 and a main outlet opening 30 with a flow path internally between the openings 28 and 30. Means are provided for connecting the fitting into the line in fluid communication as by the thread means 32 and 34. Integral with the fitting body is a fixed valve body portion 36 which, as seen in FIG. 3, defines a port 39 and includes the fixed valve body portion 36 which extends outwardly from the valve body and which is in open communication with the flow path between the main inlet and outlet openings 28 and 30, respectively, of the body portion. There may be a removable valve portion indicated generally by the numeral 41 in the fixed valve body portion. In any event, there is a movable valve portion means 55 movable between a normally closed position and the valve open position shown. There are means on the body portion for connecting a manometer to the fixed valve portion as indicated by the threads 43. The distal end of a manometer as shown in FIG. 2 and indicated by the numeral 51 is provided with a terminal end zone as at 53 which is adapted for threaded engagement with the threads 43 and to simultaneously push the distal end of the movable valve portion means 55 seen in FIG. 2 from the normally closed position to the open position shown in FIG. 3 when the manometer is in threaded engagement therewith, the nose portion 57 of the manometer being adapted to push the distal end 55 of the movable valve body portion into the open position shown when in threaded engagement with the fixed valve body portion. In use, the main on/off valve 12 is closed and after all of the valves in the downstream gas supply system are closed. Thereafter, the manometer is connected to the fixed valve body portion 36 and threadably advanced on the threads 43 opening the valve. Thereafter, any leaks in the line downstream of the pressure regulator will be detected by the manometer.

In the preferred embodiment, the improved test station will include a fitting of molded one piece material preferably metal or plastic and it is in sealing relation in the line downstream of the regulator. Preferably, it includes a cap 52 to normally close the opening in the terminal end of the fixed valve body portion to serve as a protective cap. In an example of an embodiment, the gas is supplied at about 40 pounds per square inch and reduced by the regulator to about one-half pounds per square inch and the valve may be of the Schraeder valve type with the exception that the fixed valve body portion is preferably integral with the body of the fitting.

While this invention as shown and described in what is considered to be a practical and preferred embodiment, it is recognized that departures may be made within the spirit and scope of this invention which should, therefore, not be limited except as set forth in the following claims and within the doctrine of equivalents.

What is claimed is:

1. To be utilized in a gas supply line having an upstream main on/off valve, a meter downstream of the valve, and a pressure regulator intermediate of the valve and meter which is used to supply gas to appliances at an installation site, and to be connected between a pair of adjacent, conventional flow-through pipes, a test station comprising:

a substantially small and compact pipe fitting connected in fluid flow communication in the gas supply line downstream of the pressure regulator and between the pair of conventional flow-through pipes, said pipe fitting including a body formed of a standard pipe material, said body including a first pipe opening, a second pipe opening, and a flow path therebetween, said body at said first pipe opening and said second pipe opening including pipe connection means structured and disposed to secure said pipe fitting in fluid flow, leak-free communication in a conventional pipe connecting manner between the pair of conventional flow-through pipes such that said pipe fitting functions as an ordinary link segment of the gas supply line, a fixed valve body portion integrally formed in said pipe fitting of said standard pipe material, said valve body portion including a port disposed in fluid flow communication with said flow path and having an exteriorly open distal end, a movable valve portion means captivated in said fixed valve body portion and moveable relative to said port between a normal valve closed position and a valve open position, said moveable valve portion means including biasing means normally urging said movable valve portion means to said normal closed position and requiring compressive urging of said biasing means, by applying force to said movable valve portion means, in order to move said movable valve portion means to said valve open position wherein free fluid flow into and out of the port of said fixed valve body portion is achieved, and manometer connection means disposed on said fixed valve body portion structured and disposed to enable a manometer to be removably yet securely connected to said fixed valve body portion in fluid flow communication with said port and to simultaneously move said movable valve portion means to said valve opening position such that the manometer is able to determine pressure levels in the gas supply line.

2. The test station as set forth in claim 1 wherein said fitting is of metallic material.

3. The test station as set forth in claim 1 wherein said fitting is of plastic material.

4. The test station as set forth in claim 1 wherein said means on the body for connecting the fitting into the line comprise thread means.

5. The test station as set forth in claim 1 wherein said means on the body portion for temporary connecting a manometer to the fixed valve body portion comprises threads.

6. The test station as set forth in claim 1 wherein said fixed valve body portion and said movable valve body portion comprise a Schraeder-type valve means.

7. The test station as in claim 1 wherein cap means are provided on the fixed valve body portion closing said port.

* * * * *